(12) United States Patent
Anantharaman

(10) Patent No.: US 10,553,100 B2
(45) Date of Patent: Feb. 4, 2020

(54) REMOTE AUDIO MONITOR SYSTEM

(71) Applicant: Ikabit, Inc., El Dorado Hills, CA (US)

(72) Inventor: Divya Anantharaman, El Dorado Hills, CA (US)

(73) Assignee: Ikabit, Inc., El Dorado Hills, CA (US)

( * ) Notice: Subject to any disclaimer, the term of this patent is extended or adjusted under 35 U.S.C. 154(b) by 0 days.

(21) Appl. No.: 15/626,090

(22) Filed: Jun. 17, 2017

(65) Prior Publication Data

US 2018/0365970 A1    Dec. 20, 2018

(51) Int. Cl.
  *H04W 4/80*   (2018.01)
  *G08B 25/00*  (2006.01)
  *G08B 25/10*  (2006.01)

(52) U.S. Cl.
  CPC .......... *G08B 25/001* (2013.01); *G08B 25/10* (2013.01); *H04W 4/80* (2018.02)

(58) Field of Classification Search
  CPC .. G08B 25/001; G08B 25/10; G08B 21/0202; G08B 21/0205; G08B 21/0208; G08B 21/0211; H04W 4/80; H04W 4/008
  See application file for complete search history.

(56) References Cited

U.S. PATENT DOCUMENTS

| | | |
|---|---|---|
| 9,769,686 B2 | 9/2017 | Kang et al. |
| 10,129,690 B2 | 11/2018 | Lee et al. |
| 2010/0271983 A1 | 10/2010 | Bryant |
| 2010/0303047 A1 | 12/2010 | Brima et al. |
| 2013/0178160 A1 | 7/2013 | Wang |
| 2013/0346208 A1 | 12/2013 | Bouret et al. |
| 2014/0057652 A1 | 2/2014 | Palanki et al. |
| 2014/0128032 A1* | 5/2014 | Muthukumar ........... H01Q 3/00 455/411 |
| 2014/0159877 A1 | 6/2014 | Huang |
| 2015/0237150 A1 | 8/2015 | Sweeney et al. |
| 2016/0036958 A1* | 2/2016 | Logan ..................... H04W 4/80 455/414.1 |
| 2016/0227354 A1 | 8/2016 | Zhao et al. |
| 2017/0003931 A1* | 1/2017 | Dvortsov ................. G11B 27/11 |
| 2017/0026504 A1* | 1/2017 | Nichols ................ H04M 1/7253 |
| 2017/0105190 A1* | 4/2017 | Logan .................. H04W 68/00 |
| 2017/0309142 A1* | 10/2017 | Phillips ................. G08B 7/066 |
| 2017/0316674 A1* | 11/2017 | Candy ..................... G08B 21/24 |
| 2017/0318419 A1* | 11/2017 | Sutherland ........... G06Q 50/163 |

(Continued)

OTHER PUBLICATIONS

Bluetooth Technology Website, and related links. Available at https://www.bluetooth.com/. Accessed Aug. 12, 2016.

(Continued)

*Primary Examiner* — Hai Phan
*Assistant Examiner* — Anthony D Afrifa-Kyei
(74) *Attorney, Agent, or Firm* — Bryan E. Repetto; Repetto Law, P.C.

(57) ABSTRACT

Disclosed is a remote audio monitor system and method for use. An embodiment of the system comprises one or more pods, each of the one or more pods comprising a Bluetooth radio; one or more remote audio monitors, each of the remote audio monitors comprising a Bluetooth radio; a first Bluetooth enabled receiving device; and a second Bluetooth enabled receiving device. The system can selectively alert users to sounds generated. Users may be selectively alerted based on the time of day.

40 Claims, 9 Drawing Sheets

(56) References Cited

U.S. PATENT DOCUMENTS

2018/0158288 A1* 6/2018 Logan ..................... G08B 1/08

OTHER PUBLICATIONS

Bluetooth technology basics. Available at https://www.bluetooth.com/what-is-bluetooth-technology/bluetooth-technology-basics. Accessed Aug. 12, 2016.
Bluetooth core specification. Available at https://www.bluetooth.com/specifications/bluetooth-core-specification. Accessed Aug. 12, 2016.
Wi-Fi Specifications. Available at http://www.wi-fi.org/discover-wi-fi/specifications. Accessed Aug. 12, 2016.

* cited by examiner

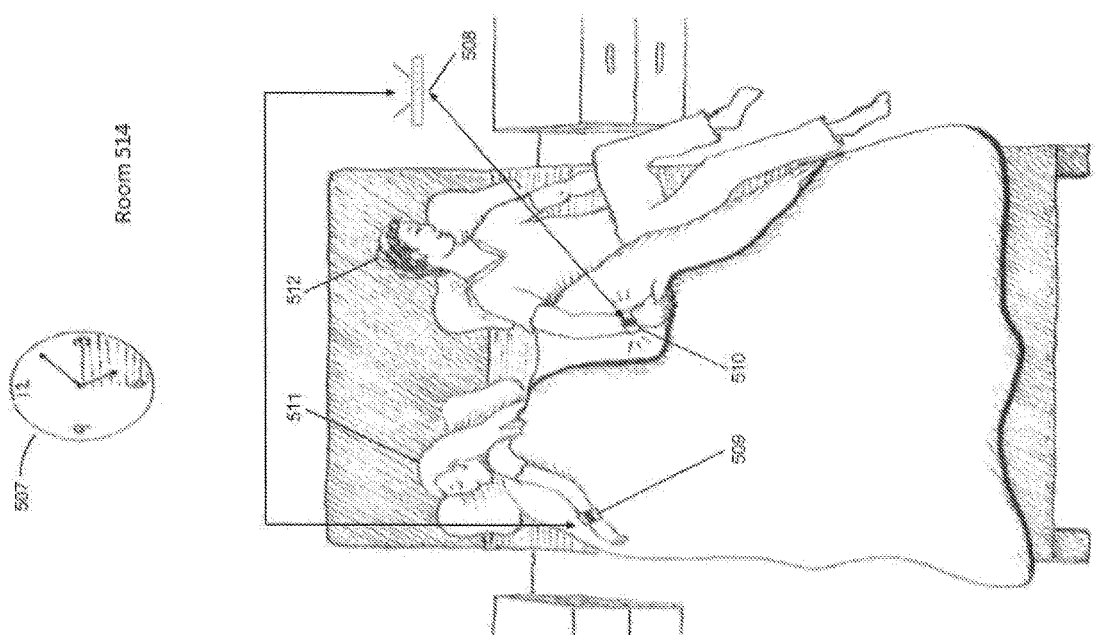
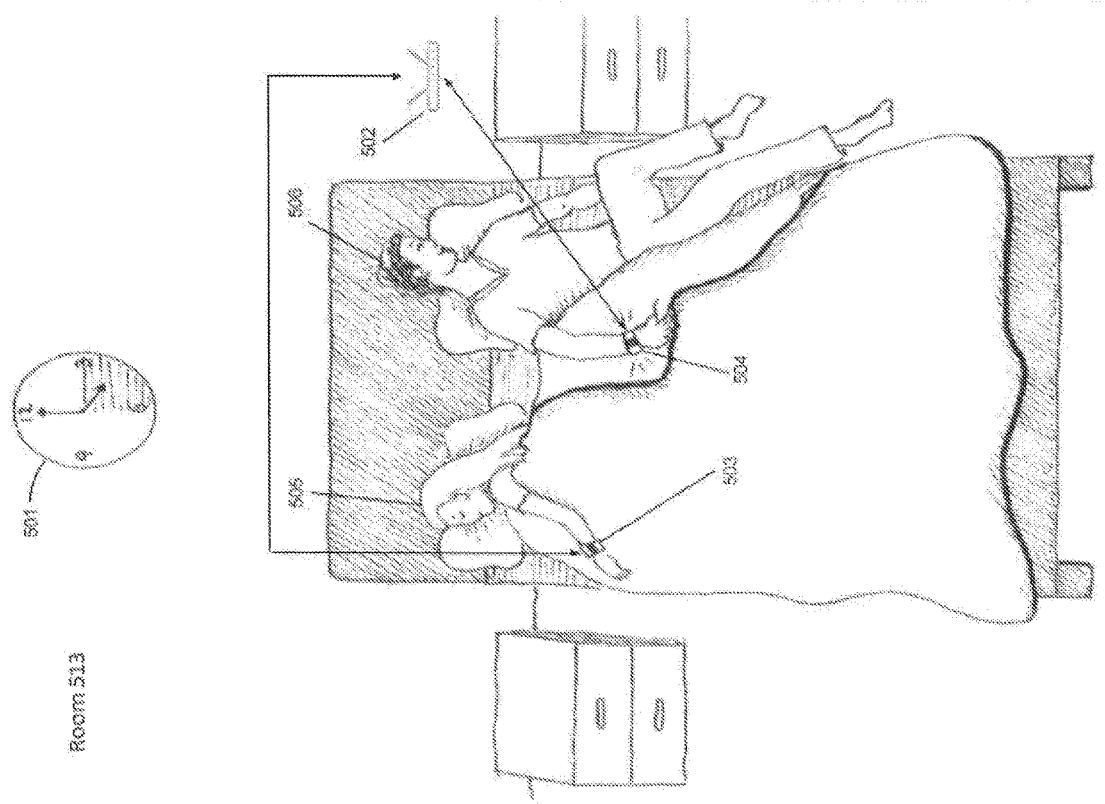
Fig 5

REMOTE AUDIO MONITOR SYSTEM

BACKGROUND

It is often advantageous to selectively transmit messages informing users of sounds in a given environment. For instance, audio monitors that detect a child's cry are commonly used by parents and other caregivers. Such monitors are widely available and are used by parents and caregivers to be alerted when a baby cries. A typical baby monitor will indiscriminately transmit data, usually audio or video signals, to one or more receivers. Such indiscriminate transmission of data is a limitation of such devices. Rather than selectively transmitting data to a specified user, all users receive the signal. In a family with two parents, this type of system would wake up both parents if the signal is transmitted at night. Similarly, such signals may disrupt work, sleep or other activities. Therefore, it is often advantageous to selectively transmit data to a specified user.

In order to transmit this data from an audio monitor, it is useful to employ Bluetooth and Wi-Fi signals. The disclosed system utilizes Bluetooth protocol over a wireless network and selectively relays data to specified users. Certain embodiments also selectively transmit data to specified users depending on the current time of day.

Bluetooth technology is limited because most Bluetooth devices currently in use have a limited range of approximately thirty feet, Wi-Fi is used to transmit data over larger distances. A device having both a Bluetooth radio and a Wi-Fi radio will be able to facilitate communication over short distances, and over much longer distances. Bluetooth signals can be used to communicate with devices in close proximity having Bluetooth radios, while a Wi-Fi radio can facilitate this kind of communication over longer distances, with more distant devices. Finally, in cellular devices, a cellular network may also be used to transmit data if a Wi-Fi access point is not available.

Wi-Fi is a wireless standard through which devices having a Wi-Fi radio are able to connect to a Local Area Network (LAN), and thereby, connect to other networks or the internet. Wi-Fi is the tradename for the IEEE 802.11 standard. In contrast to Bluetooth, Wi-Fi generally requires more complex configuration to pair devices, and is better suited when higher speeds and more bandwidth is required. Combining Bluetooth and Wi-Fi capabilities into each pod allows for the pod to receive larger volumes of data, while having the capability to easily configure a device, such as a Bluetooth headset, to receive and transmit audio data, at relatively short ranges.

BRIEF SUMMARY

Disclosed, is a system that comprises a remote audio monitor system that will selectively transmit data. In certain embodiments, a remote audio monitor will only transmit a data to a user if sound is sustained for a specified number of seconds or minutes. In other embodiments, two or more users will each have a receiver, and the system will transmit data to only one or more specified receivers depending on the time of day. Settings may also be set to alert other users if one or more users do not respond to an alert generated.

The basic architecture is based on multiple devices utilizing Bluetooth and Wi-Fi protocols. The system comprises various pod devices connected to form a small local network, with the pod devices communicating with each other using Wi-Fi signals, and communicating over Bluetooth signals with one or more Bluetooth enabled devices in this network. As Bluetooth signals are limited in range, Bluetooth signals are used only to communicate with other Bluetooth devices in close proximity. Each pod comprises a microprocessor with necessary onboard memory running a small operating system and has a Bluetooth radio, a Wi-Fi radio and basic computer functions. This device can be coupled to either AC or DC power source, depending, on the usage and is capable of converting Bluetooth data to Wi-Fi data and vice versa, to facilitate communication between the two kinds of wireless devices. Each pod is capable of handling multiple Bluetooth slave devices at the same time. In such a configuration, the pod serves as a master, and each Bluetooth enabled device coupled to the pod serves as a slave. Furthermore, the pod is also capable of transmitting data over Wi-Fi to an internet gateway that allows the system to be accessed and controlled through internet enabled devices.

FIGURES

FIG. 5 illustrates an embodiment of a remote audio monitor system wherein the second of two users is being selectively alerted based on the time.

DETAILED DESCRIPTION

Figure 1:
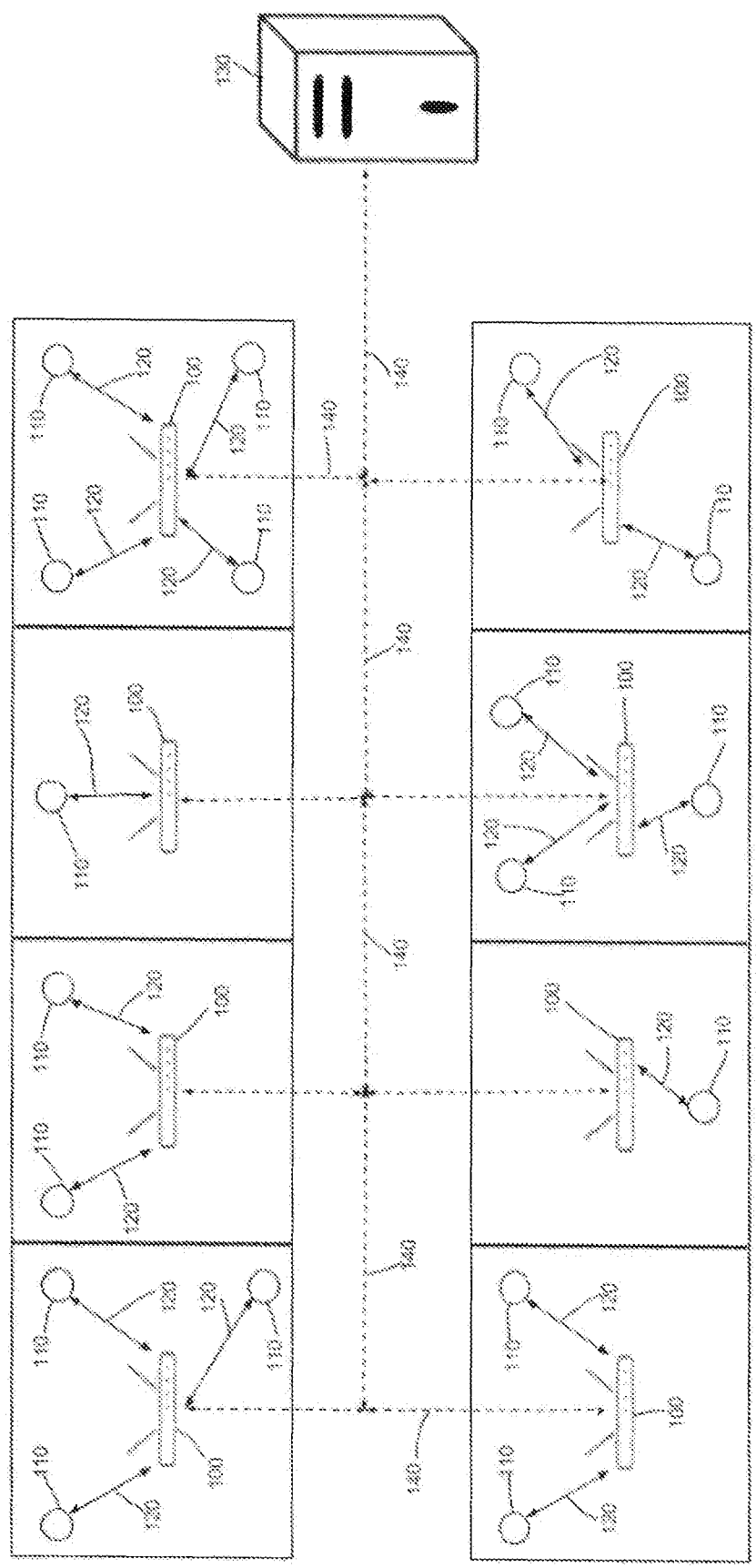
FIG. 1 is an illustration of an embodiment of system wherein Bluetooth enabled devices are coupled to a pod, with each pod being coupled to multiple pods via Wi-Fi signals, and each pod is coupled to an internet gateway.
Figure 7:
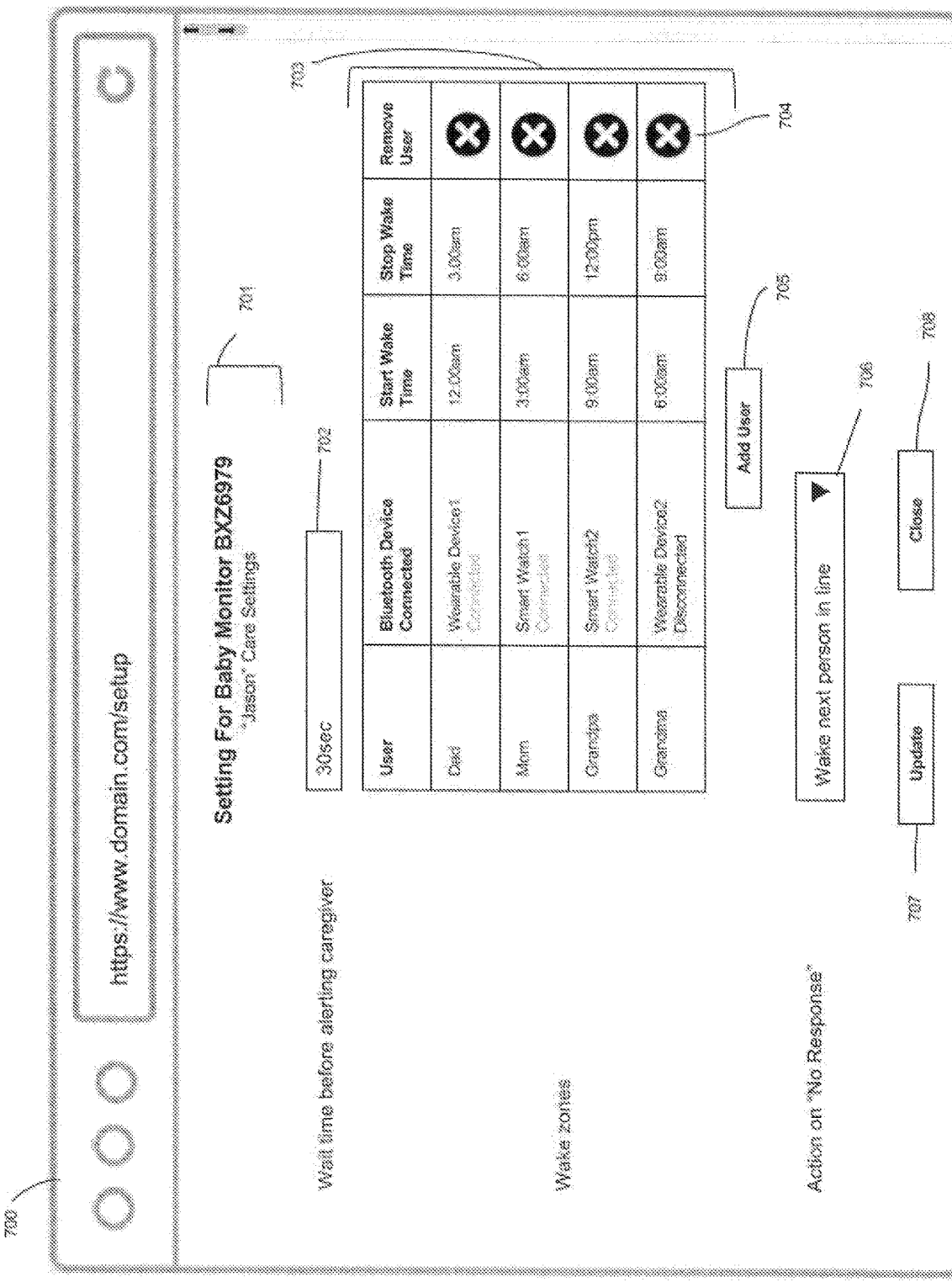
FIG. 7 illustrates an embodiment of an internet based user interface, accessed through a browser, through which a user can enter settings to control a remote audio/video monitor system.
Figure 8:
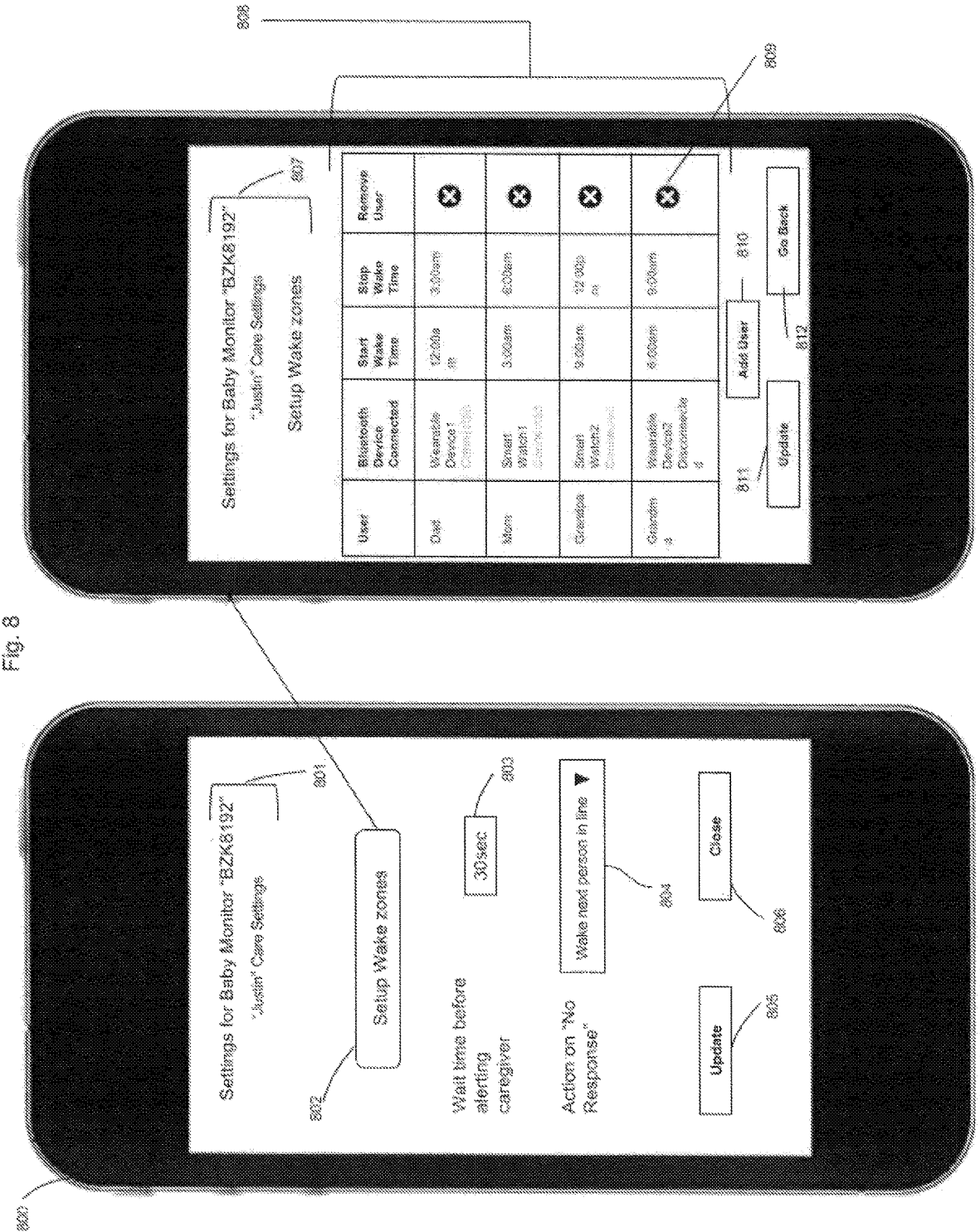
FIG. 8 illustrates an embodiment of an internet based user interface, accessed by a smart phone or tablet, through which a user can enter settings to control a remote audio/video monitor system.

Disclosed is a remote audio monitor system, using wireless devices over a computer network. FIG. 1 illustrates a representative embodiment of such a system. Each user has a Bluetooth enabled device 110 or alternatively, a Wi-Fi enabled device. In certain embodiments, the Bluetooth enabled device is a wearable Bluetooth enabled device, but any Bluetooth enabled device, with the ability to send and transmit data, may be utilized. Bluetooth signals 120 are transmitted between the pod 100 and a Bluetooth enabled device 110. The system architecture is comprised of a network of one or more pods 100. Each pod is equipped with both a Bluetooth radio and a Wi-Fi radio, and is capable of transmitting data over both Bluetooth and Wi-Fi protocols. Each pod also comprises computer functionality, including non-transitory computer readable media, digital storage, and a processor. The Bluetooth enabled devices have a limited range, typically approximately thirty feet in the most common application. In certain embodiments, especially in embodiments in which the system will be deployed over a large area, multiple pods are disposed at a distance to ensure the Bluetooth enabled devices are always in range of pod in a given area. In certain embodiments, pods are situated at a distance of, or less than, approximately thirty feet from each other, to ensure at least one pod is always in range of a Bluetooth enabled device. In certain situations, it may be necessary to position pods in closer range to each other. For example, in environments where the system will cover an area with multiple walls in close proximity, or a building having multiple floors, pods may be positioned closer together. In certain embodiments, each pod is coupled to an internet gateway 130. When coupled to an internet gateway 130, the system may utilize internet based storage and internet and an internet based user interface. Each pod maintains a list of the each of the other pods on the system and the Bluetooth enabled devices 110 connected to the pod. Additionally, each pod 100 locally stores a directory of all the Bluetooth enabled devices that are authorized to receive data on the network. The directory is updated as new devices are added to the system or existing devices are removed from the system. In certain embodiments, a system administrator authorizes each Bluetooth enabled device to access the system. A user interface, as illustrated in FIG. 7 and FIG. 8, is used by administrators to establish settings for the system. When a new pod or Bluetooth enabled device is added or removed from the system, a signal 140 is transmitted to each pod, thereby updating each locally stored directory. Signals 140 transmitted between pods are Wi-Fi signals. Additionally, signals transmitted between the pods 100 and the internet gateway 130 are Wi-Fi signals. The security of the system is ensured because the pods will only connect to previously authorized pods, gateways, or Bluetooth enabled devices. FIG. 1 illustrates various communication patterns among Bluetooth enabled devices 110 and pods 100. When a user transmits a message through a first Bluetooth enabled device 110, the message is transmitted as a Bluetooth signal 120 to a first pod 100. The first pod 100, can then transmit the message to a second Bluetooth enabled device 110 via a Bluetooth signal 120, provided the second Bluetooth enabled device is within range of the first pod. If the second Bluetooth enabled device is not within range of the first pod, the message is transmitted via a Wi-Fi signal 140 to a second pod 100, in range of, and connected to, the second Bluetooth enabled device 110. In certain embodiments, the message can also be transmitted from the first Bluetooth enabled device, via a Bluetooth signal 120, to a first pod 100, and then, via a Wi-Fi signal 140, to an internet gateway 130. The internet gateway can then transmit the message to any device coupled to the internet, or to another system utilizing the same protocol as the system disclosed herein.

As described herein, Bluetooth signals may be received and transmitted by any device capable of sending or receiving Bluetooth signals, including, but not limited to, wearable Bluetooth enabled devices, pods, remote audio monitors, and smartphones. Figures illustrate wearable Bluetooth enabled devices as smartwatches, but this is for illustration purposes only; any Bluetooth enabled device that may be worn by a user, may be considered a wearable Bluetooth enabled device, and any non-wearable Bluetooth enabled device may be used in place of a wearable device. Therefore, multiple types of devices may be used as a Bluetooth enabled receiving device.

Figure 2:
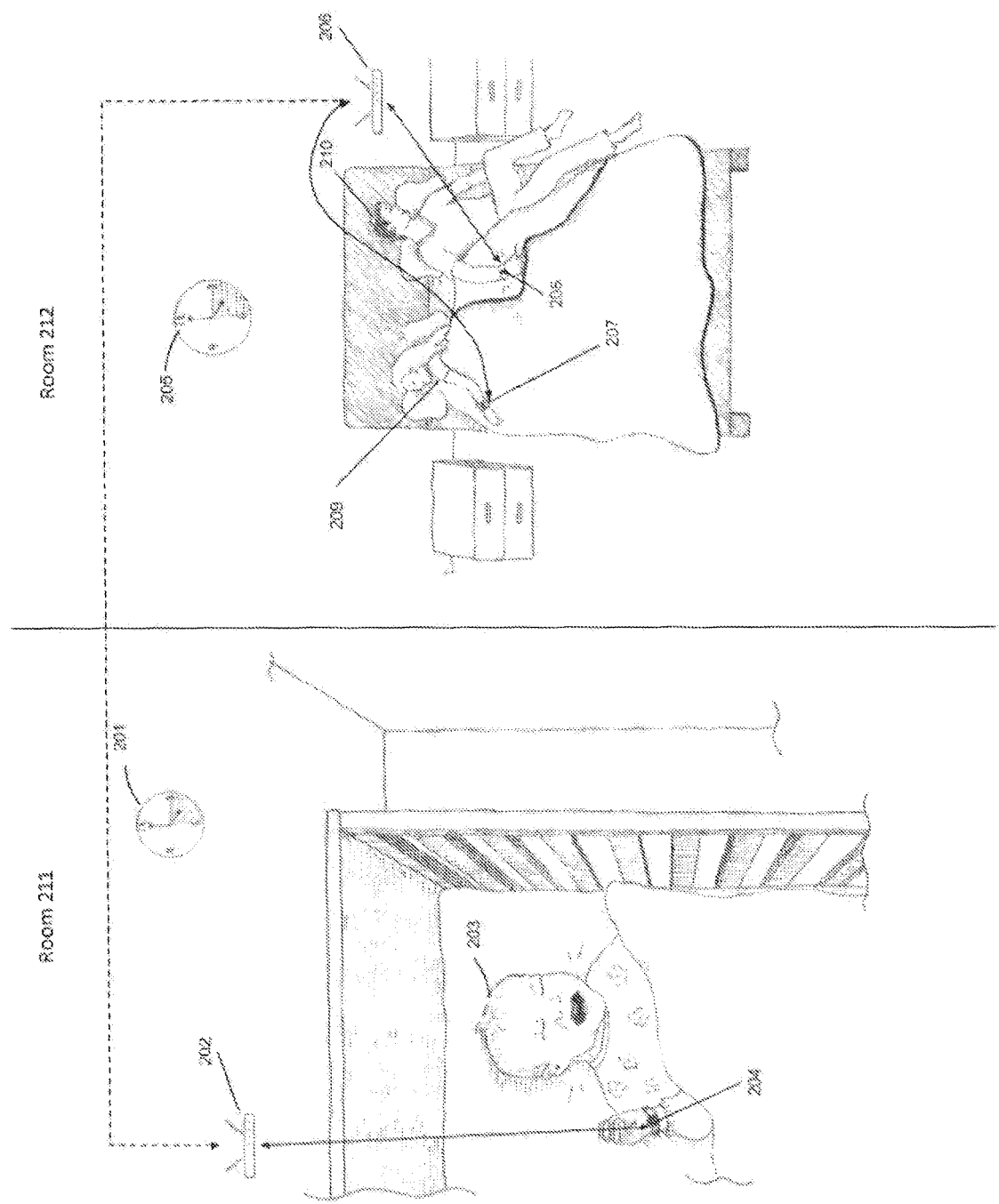
FIG. 2 is an illustration of an embodiment of a remote audio monitor system, wherein parents are alerted to a crying baby in another room.

FIG. 2 illustrates an embodiment of a such a system, wherein a first pod 202 is located in a first room 211 and a second pod 206 is located in a second room 212. In the first room, 211, is a first user 203 who is wearing a wearable Bluetooth enabled device 204. The first user illustrated is a baby, but this illustration is by way of example and not limitation; the first user need not be a baby, and in certain embodiments, a Bluetooth enabled device that is not worn by a user may be used in place of a wearable Bluetooth enabled device. The wearable Bluetooth enabled device illustrated in FIG. 2 is a watch, but any Bluetooth enabled device comprising an electronic device capable of receiving sound and receiving and transmitting Bluetooth packets could be used. In the second room 212, there is a second pod 206 a second user 209 and a third user 210. The second user 209 is wearing a second wearable Bluetooth enabled device 207, and the third user 210 is wearing a third wearable Bluetooth enabled device 208. The second wearable Bluetooth enabled device 207 and the third wearable Bluetooth enable device 208 are illustrated as watches, but may be any Bluetooth enabled device capable of receiving and transmitting Bluetooth packets. As illustrated in FIG. 2, the second user is the mother 209 of the first user 203, and the third user 210 is the father of the first user 203. When the first user 203 creates an audible noise (for example, when the first user 203 is a baby, when the baby cries), the first wearable Bluetooth enabled device 204, detects the sound, and transmits Bluetooth packets to the first pod 202, with the Bluetooth packets, indicating a sound was produced, and may also include packets comprising the sound produced, and may include video images and other data acquired. The first pod 202 then converts the data contained in the Bluetooth packets to Wi-Fi packets, and transmits Wi-Fi packets to the second pod 206. The second pod 206 will then convert the Wi-Fi packets to Bluetooth packets and selectively transmit data to either the second user 209 or third user 210, or to both the second user 209 and third user 210. System settings will determine whether data is transmitted to one or more users. In the embodiment illustrated in FIG. 2, the clock is depicted at a time of 4:00 201 will determine which user will receive data. As illustrated in FIG. 2, the third wearable Bluetooth enabled device 208, has received a data transmission and has alerted the third user 210. In FIG. 2, the data transmission encoded a signal to cause the third wearable Bluetooth enabled device to vibrate or produce an audible alert, or vibrate and produce an audible alert to wake the third user 210. The audible alert may be an alarm, digitally stored sound, or the sound detected by the first wearable Bluetooth enabled device 204. As illustrated in FIG. 2, the second user 209, did not receive an alert, and therefore continued to sleep, while the third user 210, woke up to respond to the alert and the sound in the first room 211. The system can be configured to selectively alert users at specified times. As illustrated in FIG. 2, this allows parents the ability to split parenting responsibilities and allows each parent to have specified periods when each parent will be woken when a baby cries, and other periods when a parent will not be woken, and able to sleep. Among other benefits over existing devices, this feature has particular utility when used by couples who have childcare responsibilities, and have demanding schedules that provide for limited time for sleep.

The wearable Bluetooth enabled devices illustrated in FIG. 2, and throughout the figures, illustrate an embodiment wherein a wearable Bluetooth enabled device is used as a Bluetooth enabled receiving device. In certain embodiments, a Bluetooth enabled receiving device may be any device capable of receiving data in the form of Bluetooth packets, generating an alert (either by vibrating, producing an audible sound, displaying an image or video or text, or combination thereof), and receiving and transmitting a response from a user. In certain embodiments, a device that is Wi-Fi enabled may be used in place of a Bluetooth enabled device. In such embodiments, the Wi-Fi enabled device, will at a minimum, be equipped with a Wi-Fi radio.

Figure 3:
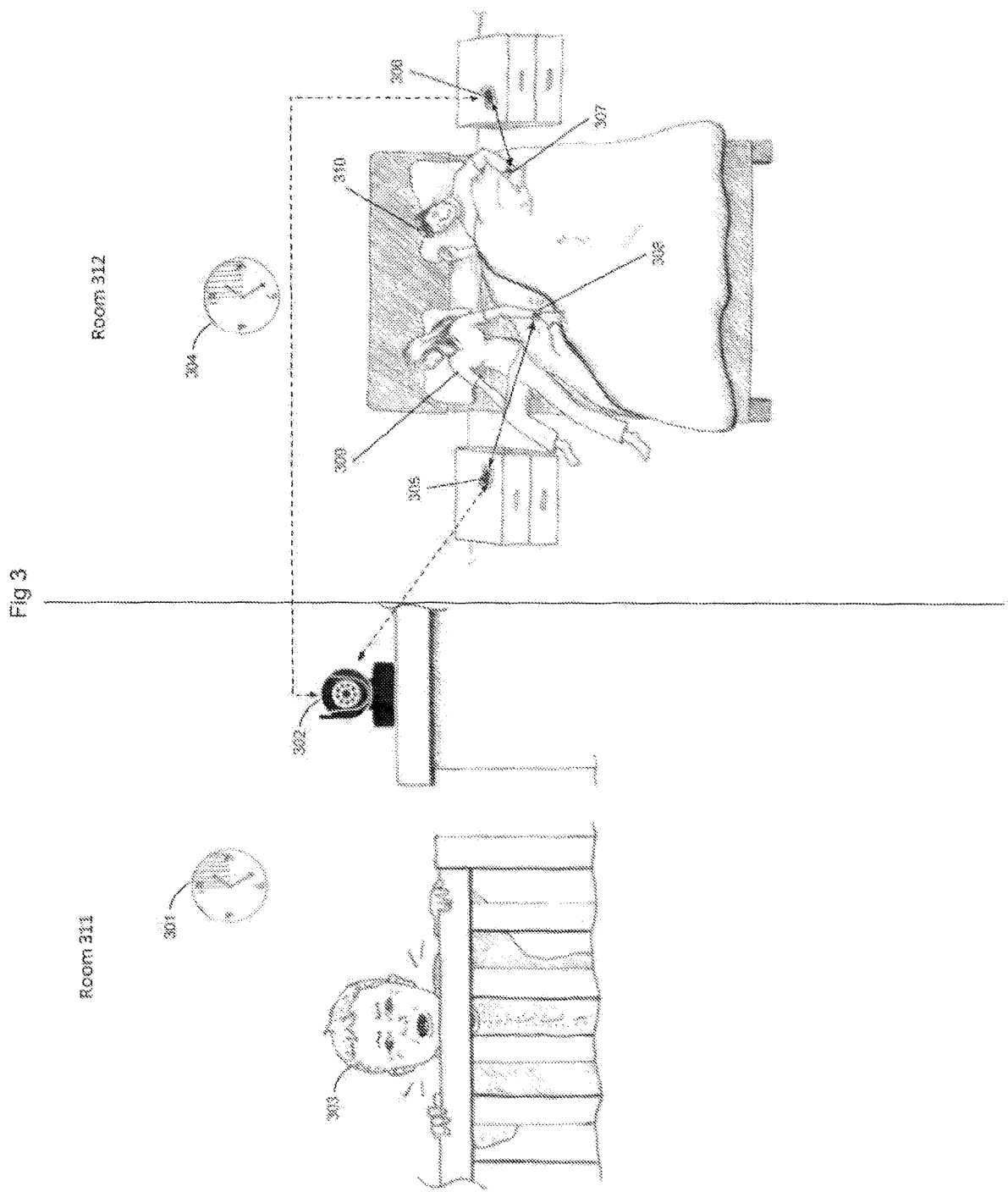
FIG. 3 illustrates an embodiment of a remote audio monitor system wherein the remote audio monitor is a baby monitor, and is selectively transmitting data to a specified parent in another room.
Figure 4:
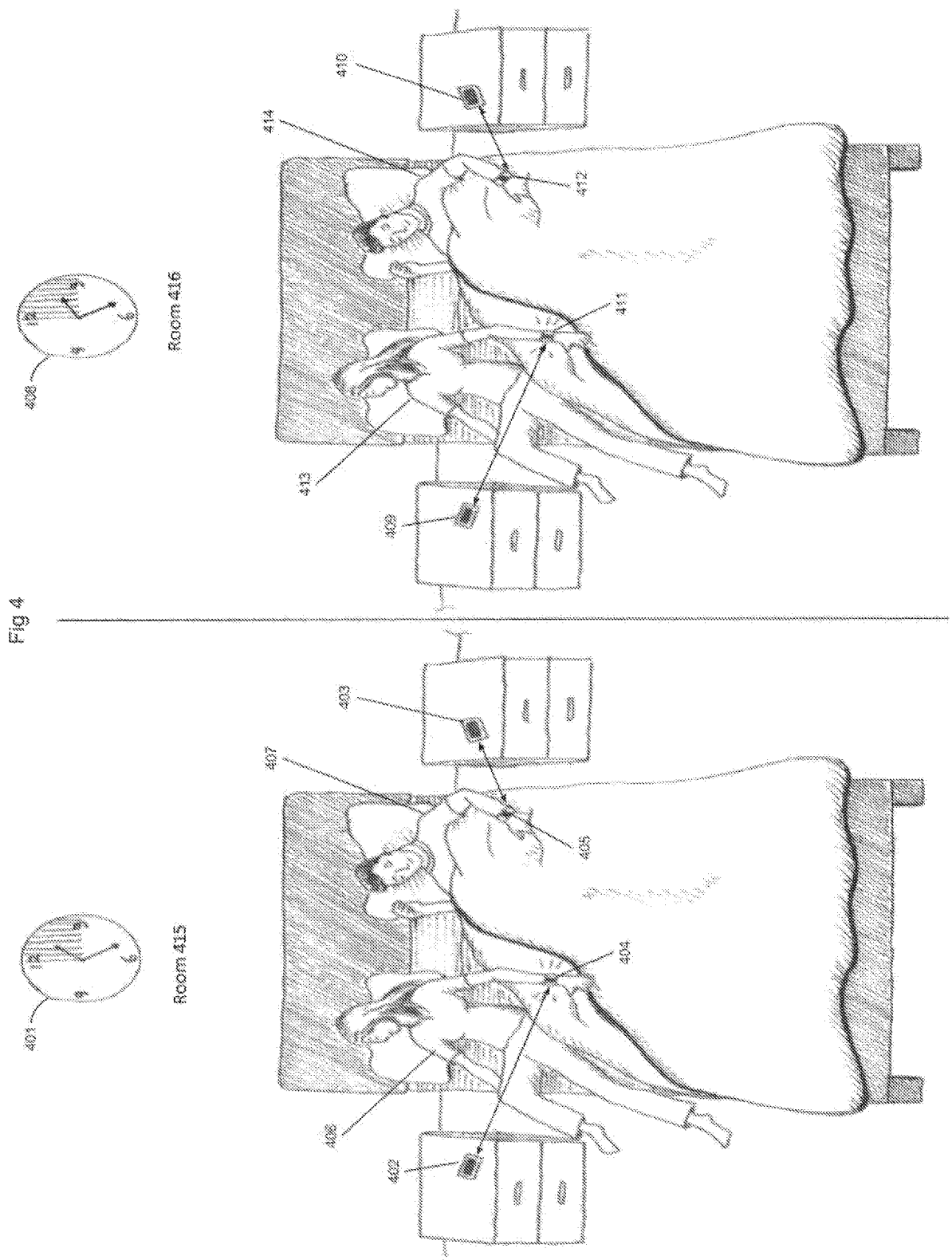
FIG. 4 illustrates an embodiment of a remote audio monitor system wherein one of two users is being selectively alerted based on the time and each user is in a different time zone.

FIG. 3 illustrates an embodiment wherein a remote audio/video monitor 302 is situated in a first room 311, and the remote audio monitor transmits Wi-fi data to a second room 312. In this embodiment, the remote audio monitor 302 is equipped with a Wi-Fi radio, and may optionally also be equipped with a Bluetooth radio. The remote audio monitor depicted in FIG. 3 also has video capabilities. In embodiments having video capabilities, the devices on the system will comprise features such as video recording devices, light detection devices, motion detection devices, video monitors, and other features to transmit video images. In such embodiments, video images may be viewed on receiving devices, and motion may be detected and used as the basis for generating an alert. In the illustrated embodiment, sound produced by a child 303 is detected by the remote audio monitor 302. Although a child is illustrated, sound may be generated by a person of any age, one or more animals, objects, inanimate objects, weather, or any other sound producing object. When the remote audio monitor 302 detects a sound, a Wi-Fi signal is generated, and selectively transmitted. As illustrated by FIG. 3, the second room 312 has a first user 309 and a second user 310. The first user has a first smartphone 305, coupled to a first wearable Bluetooth enabled device 308. Similarly, the second user 310 has a second smartphone 306, which is coupled to a second wearable Bluetooth enabled device 307. The time depicted in FIG. 3 is 1:25 301 in the first room 311 and 1:25 304 in the second room 312. Two similar configurations are depicted in FIG. 4, wherein a first user 406 is illustrated having a first smartphone 402 coupled to a first Bluetooth enabled wearable device 404, and second user 407 having a second smartphone 403 and a second wearable Bluetooth enabled device 405 at a time of 2:25 401. The same embodiment having a first user 413 is illustrated having a first smartphone 409 coupled to a first Bluetooth enabled wearable device 411, and second user 414 having a second smartphone 410 and a second wearable Bluetooth enabled device 412, at a time of 2:25 408.

When a sound is detected by the remote audio monitor 302, a determination is made as to whether an alert should be generated to alert the first user, the second user, neither the first user nor the second user, or both the first user and the second user. In certain embodiments, the system will be programmed to selectively alert specified users based on the current time of day. In the embodiment illustrated in FIG. 3, the remote audio monitor 302, detected sound from the child 303. A determination is made that, based on the current time, an alert is to be transmitted to the first user 309. The remote audio monitor 302 then converts the sound to Wi-Fi packets, generates an alert, and transmits the Wi-Fi packets to the first smartphone 305 associated with the first user 309. In certain embodiments, an alert, such as vibration or audio alert or video alert, can be generated by the first smartphone 305. In other embodiments, the first smartphone 305 converts the Wi-Fi packets to Bluetooth packets, transmits the Bluetooth packets to the first wearable Bluetooth enabled device 308, and the first Bluetooth enabled device 308 generates an alert such as a sound, vibration, or text or an audio/video message. As illustrated in FIG. 3 and FIG. 4, the second user 310 407 414 respectively did not receive an alert. As illustrated, the second user continued to sleep, while the first user was woken to attend to the needs of the child 303 in the first room 311.

FIG. 5 illustrates an embodiment where in the second room 513 is illustrated at a time of 4:00 501 and the second room 514 is illustrated at a time of 5:10 507. The second room 513 at 4:00 501 has a first user 505 wearing a first wearable Bluetooth enabled device 503 and a second user 506 wearing a second wearable Bluetooth enabled device 504, with a pod 502 located in the room 513. The second room 514 at a time of 5:10 507 has a first user 511 wearing a first wearable Bluetooth enabled device 509 and a second user 512 wearing a second wearable Bluetooth enabled device 510, with a pod 508 located in the room 514. In the embodiment illustrated in FIG. 5, the remote audio monitor 302, transmits Wi-Fi packets to the pod 502. The pod 502 then converts the Wi-Fi packets to Bluetooth packets, and transmits the Bluetooth packets to the second wearable Bluetooth enabled device 504, associated with the second user 506. The second wearable Bluetooth enabled device 504 then generates an alert to wake the second user. As before, the second user is alerted based on system settings, alerting the second user during specified times. In the embodiment depicted, computer readable media, having computer executable instructions for selectively transmitting data to a specified user may reside on any or all of, the pod 502, the remote audio monitor 302, or a remote device coupled to the system. A particular feature of certain embodiments are multiple time zones. As used herein, a time zone is a specified period of time defined by a start time and an end time which indicate a period of time when a specific user will be alerted. As illustrated in FIG. 5, all alerts are transmitted to the second user 506, 512 because the second user is the specified user for the time zone in which the alert is generated.

Figure 6:
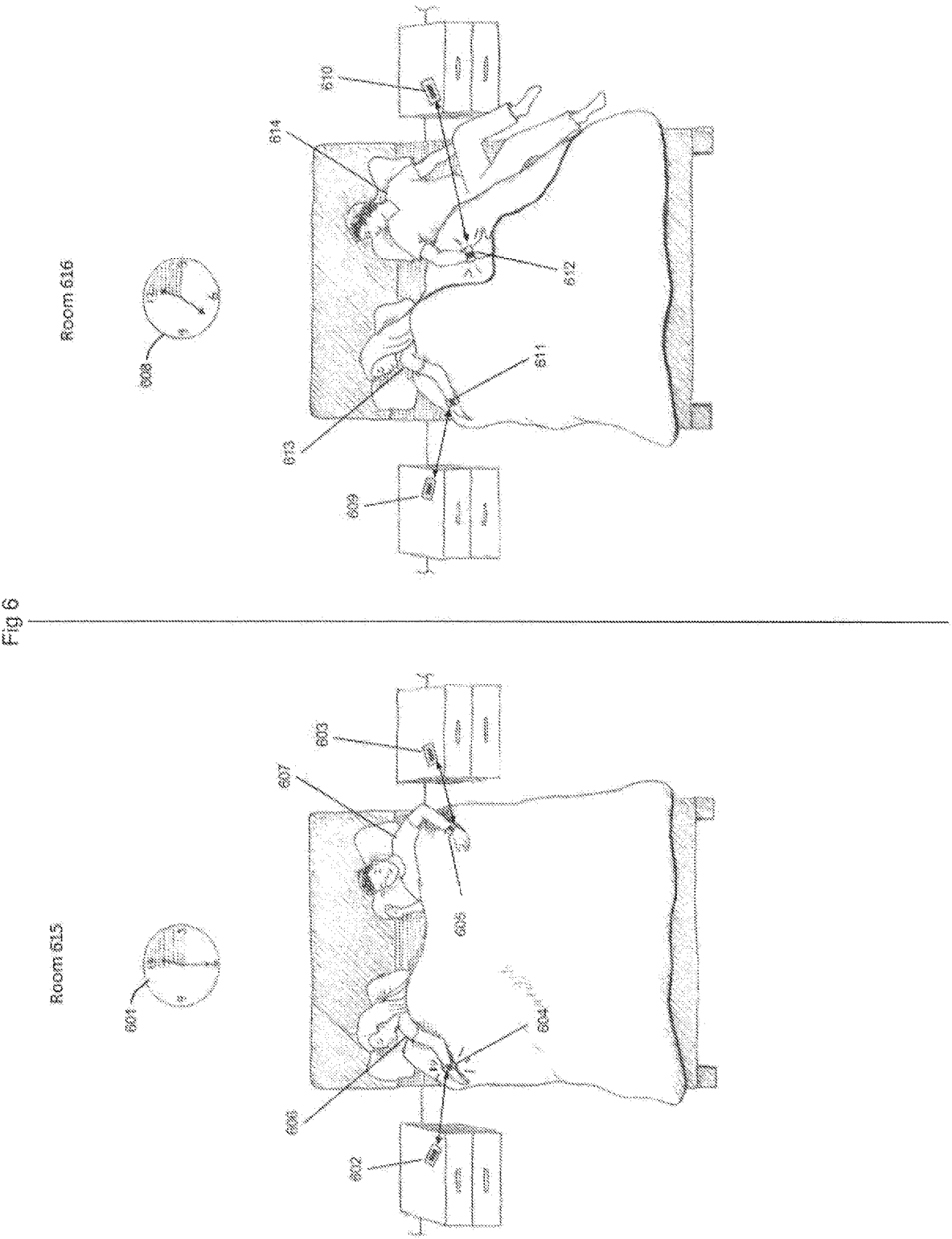
FIG. 6 illustrates an embodiment of a remote audio monitor system wherein a first user did not respond to an alert, and a second user was notified.

FIG. 6 illustrates an embodiment of the second room at different time intervals. The second room 615 at a time of 12:30 601 has a first user 606, a first smartphone 602, and a first wearable Bluetooth enabled device 604, a second user 607, a second smartphone 603, and a second wearable Bluetooth enabled device 605. The second room 616 at a time of 12:35 608 has a first user 613, a first smartphone 609, and a first wearable Bluetooth enabled device 611, a second user 614, a second smartphone 610, and a second wearable Bluetooth enabled device 612. At 12:30 601, the first user 606, received an alert on the first wearable Bluetooth enabled device 604 illustrated by the vibrating first Bluetooth enabled device 604. As illustrated, according to the system settings, an alert was not transmitted to the second user wearing the second Bluetooth enabled device 605. At 12:30 601, the first user is not responding to the alert generated by the first wearable Bluetooth enabled device 604. If the first user 606 responded to the alert, by giving some indication on the wearable Bluetooth enabled device 604, a signal would have been transmitted to the system, indicating the first user had responded to the alert. In this instance, Bluetooth packets would be transmitted from the first wearable Bluetooth enabled device, to the first smartphone, and the smartphone would relay data, indicating the first user had responded to the alert, to the device that transmitted the original alert. In certain embodiments, this alert may be transmitted through a Wi-Fi or cellular network. As illustrated in FIG. 6, after five minutes, the first user 613 has not responded to the alert. At 12:35 608, recognizing the initial alert has not elicited a response, the system generates a second alert to the second wearable Bluetooth enabled device 612, worn by the second user 614. As depicted in FIG. 6, the second user 614 has woken to respond to the alert. Although an interval of five minutes was illustrated, this interval was provided as an example only. In certain embodiments, the system can be configured to alert a second user after any duration of time has elapsed that an alert has been unanswered by a first user. In such embodiments, this is used as a backup option when the first user does not respond. Further, specified users may be preselected to receive an alert in the event that an alert is not responded to by another user. In other embodiments, the first user can be alerted multiple times before alerting the second user or multiple users can be alerted at once in the event of an emergency.

The system settings may be configured from a computer device. In certain embodiments, the system can be configured through an internet browser. FIG. 7 illustrates an embodiment wherein a user interface is displayed through a browser 700. The user interface may display the name of the remote audio monitor 701. A wait time may be specified before alerting any user 702. In embodiments where the remote audio monitor is used as a baby monitor, the time may be the time a child may cry before a caregiver will be alerted. Times in which a specified user will be alerted, are identified as "Wake Zones" 703. In the embodiment illustrated, users are listed with each user being associated with a specific device. Times are specified when each user may be alerted, and may include a start and stop wake time. The user interface allows for users to be removed 704, and added 705. Users may select options if there is no response to an alert 706. If an alert is not responded to, users may select to alert the next person, alert all users, not alert any other users, or transmit the alert to the original user again. The user interface may include the ability for the user to close the window 708 and update the system 707.

FIG. 8 depicts a user interface, as displayed on a smartphone 800. The same functions are present, and the same functions may be carried out on a smartphone as on a desktop computer, but the user interface may be displayed on multiple screens or in a different format. The user interface may display the name of the remote audio monitor 801. A wait time may be specified before alerting any user 803. In the embodiment depicted, users will select an option to view and setup "Wake Zones" 802. In the embodiment illustrated, "wake zones", users, devices, and times users will be alerted are displayed on a separate screen 808. Times are specified when each user may be alerted. The user interface allows for users to be removed 809, and added 810. The "wake zone" screen also includes a "go back" option 812 and an option to update any changes in the given screen 811. Users may select options if there is no response to an alert 804. If an alert is not responded to, users may select to alert the next person, alert all users, not alert any other users, or transmit the alert to the original user again. The user interface may include the ability for the user to close the window 806 and update the system settings 805.

Figure 9:
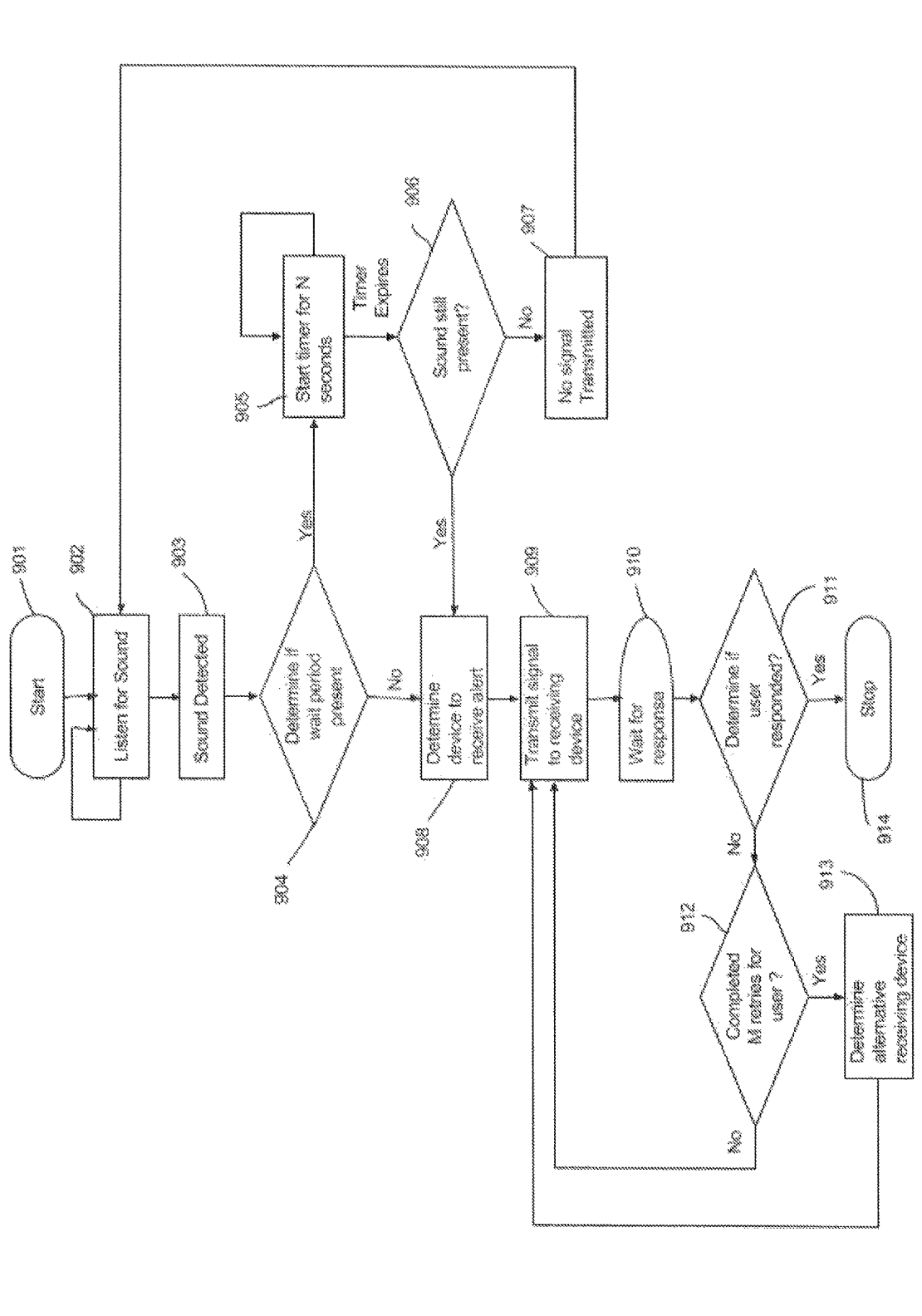
FIG. 9 illustrates an embodiment of a method to selectively transmit data, to specified users, over a remote audio/video monitor system.

FIG. 9 illustrates an embodiment of a method of operating the system 900. The method may exist as non-transitory computer readable instructions, on computer readable media, wherein the computer readable media may be coupled to a pod, smartphone, wearable Bluetooth enabled device, remote audio monitor, or server or device coupled to the internet. In embodiments, wherein the computer readable media encoding computer readable instructions is coupled to a device or computer coupled to the internet, at least one or more devices on the system must also be coupled to the Bluetooth, Wi-Fi, or a cellular network. The method for operating the system 900 starts 901 with a device waiting to detect a sound 902. The device can be any device on the system, capable of detecting sound. The device will continue to wait to detect sounds until a sound is detected 903. Once a sound is detected 903, a determination will be made if the system settings require the sound to continue for a specified period of time before transmitting a signal 904. If settings require the sound to continue for a specified period of time, the sound will be timed 905. After the specified period of time, a determination will be made if the sound is still present 906. If the sound is not present 907, none of the users are alerted and no data will be transmitted, and the device will resume detecting sounds 902. If a sound is present for the specified period of time, or if no period of time was specified, a determination is made as to which device will receive a signal 908. A signal will then be transmitted to the specified device 909. Once a signal is transmitted, the system will wait for a response from the alerted user 910, and then determine if the user responded 911. If the user responded, the process ends 914. If the user does not respond, the system then determines if the settings set forth a specified number attempts to resend the signal 912. If there is a specified number of attempts to resend the signal, the system will resend the signal 909 to the specified device, wait for a response 910, and determine if the user responded 911 until the user responds 914 or until the number of attempts specified are completed. If the required number of reattempts have been reached, the system will then determine if another device has been specified to receive a signal 913. If another device has been specified, the process will repeat, until a user responds, or until attempts to elicit a response from all alternative receiving devices has been exhausted.

While the invention has been described and illustrated with reference to certain embodiments thereof, those skilled in the art will appreciate that the various adaptations, changes, modifications, substitutions, deletions, or additions or procedures and protocols may be made without departing from the spirit and scope of the invention. It is intended, therefore, that the invention be defined by the scope of the claims that follow and that such claims be interpreted as broadly as reasonable.

What is claimed is:

1. A remote audio monitor system comprising:
   one or more pods, each of the one or more pods comprising a Bluetooth radio;
   one or more remote audio monitors, each of the remote audio monitors comprising a Bluetooth radio;
   a first Bluetooth enabled receiving device;
   a second Bluetooth enabled receiving device; and
   non-transitory computer readable media, said computer readable media having computer executable instructions for performing a method comprising the steps of:
   waiting to detect a sound through a remote audio monitor;
   detecting a sound;
   determining whether the first Bluetooth enabled receiving device or the second Bluetooth receiving device should receive an alert, based on settings established through a user interface;
   determining a device to receive the alert is the first Bluetooth enabled receiving device, based on settings established through the user interface;

transmitting an alert to the first Bluetooth enabled receiving device;
determining a time;
selectively transmitting an alert to the first Bluetooth enabled receiving device based on the time, in accordance with settings established through the user interface;
waiting for a response from a first user, through the first Bluetooth enabled receiving device; and
determining if the first user responded;
wherein the following settings are controlled through the user interface:
times when alerts will be transmitted to the first Bluetooth enabled receiving device;
times when alerts will be transmitted to the second Bluetooth enabled receiving device;
addition of other Bluetooth enabled receiving devices;
removal of Bluetooth enabled receiving devices from the system;
time periods for which sound must be present before an alert will be sent; and
actions to be taken by the system if no response is received from the first user.

2. The remote audio monitor system of claim 1, wherein the computer executable instructions for performing the method further comprises the steps of:
determining if the first user responded by receiving data from the first Bluetooth enabled receiving device.

3. The remote audio monitor system of claim 1, wherein the computer executable instructions for performing the method further comprises the steps of:
determining the first user has not responded; and
transmitting the alert to the first Bluetooth enabled receiving device one or more times, a total number of one or more times determined by settings established on the system.

4. The remote audio monitor system of claim 3, wherein the computer executable instructions for performing the method further comprises the steps of:
determining the first user has not responded to the alert one or more times;
determining if the second Bluetooth enabled receiving device is present on the system;
determining the second Bluetooth enabled receiving device; and
transmitting the alert to a second user through the second Bluetooth enabled receiving device.

5. The remote audio monitor system of claim 4, wherein the computer executable instructions for performing the method further comprises the steps of:
waiting for a response from the second user, through the second Bluetooth enabled receiving device; and
determining if the second user responded.

6. The remote audio monitor system of claim 4, wherein the computer executable instructions for performing the method further comprises the step of:
determining the second user responded by receiving data from the second Bluetooth enabled receiving device.

7. The remote audio monitor system of claim 5, wherein the computer executable instructions for performing the method further comprises the steps of:
determining the second user has not responded to the alert one or more times;
determining if there is a third Bluetooth enabled receiving device;
determining the third Bluetooth enabled receiving device; and
transmitting the alert to a third user through the third Bluetooth enabled receiving device.

8. The remote audio monitor of claim 1 or claim 7 further comprising:
one or more audio monitors that further comprise a video monitor and a Wi-Fi radio; and
one or more pods further comprising a Wi-Fi radio.

9. The remote audio monitor system of claim 1 or claim 7, wherein the computer executable instructions for performing the method further comprises the step of:
determining if a wait period is present, after an onset of a detected sound.

10. The remote audio monitor system of claim 9, wherein the computer executable instructions for performing the method further comprises the steps of:
timing a period of a detected sound; and
determining if the detected sound is still present after a specified period.

11. The remote audio monitor system of claim 10, wherein the computer executable instructions for performing the method further comprises the step of:
determining the sound was not present for the specified period.

12. The remote audio monitor system of claim 10, wherein the computer executable instructions for performing the method further comprises the steps of:
determining the sound is present for the specified period of time; and
transmitting an alert to the first Bluetooth enabled device.

13. The remote audio monitor system of claim 12 wherein at least one of the first Bluetooth enabled receiving device or the second Bluetooth enabled receiving device comprises a wearable Bluetooth enabled device.

14. A method for selectively transmitting alerts over a remote audio monitor system comprising the steps of:
waiting to detect a sound through a remote audio monitor;
detecting a sound;
determining whether a first Bluetooth enabled receiving device or second Bluetooth receiving device should receive an alert, based on settings established through a user interface;
determining the first Bluetooth enabled receiving device will receive the alert;
transmitting the alert to the first Bluetooth enabled receiving device;
determining a time;
selectively transmitting an alert to the first Bluetooth enabled receiving device based on the time, in accordance with settings established through a user interface;
waiting for a response from a first user, through the first Bluetooth enabled receiving device; and
determining if the first user responded
wherein the following settings are controlled through the user interface:
times when alerts will be transmitted to the first Bluetooth enabled receiving device;
times when alerts will be transmitted to the second Bluetooth enabled receiving device;
addition of other Bluetooth enabled receiving devices;
removal of Bluetooth enabled receiving devices from the system;
time periods for which sound must be present before an alert will be sent; and
actions to be taken by the system if no response is received from the first user.

15. The method for selectively transmitting alerts over a remote audio monitor system of claim 14 further comprising the step of:
determining the first user responded by receiving data from the first Bluetooth enabled receiving device.

16. The method for selectively transmitting alerts over a remote audio monitor system of claim 15 further comprising the steps of:
determining the first user has not responded; and
transmitting the alert to the first Bluetooth enabled receiving device one or more times, a total number of one or more times determined by settings established on the system.

17. The method for selectively transmitting alerts over a remote audio monitor system of claim 16 further comprising the steps of:
determining the first user has not responded to the alert one or more times;
determining if the second Bluetooth enabled receiving device is present on the system;
determining the second Bluetooth enabled receiving device; and
transmitting the alert to a second user through the second Bluetooth enabled receiving device.

18. The method for selectively transmitting alerts over a remote audio monitor system of claim 17 further comprising the steps of:
waiting for a response from the second user, through the second Bluetooth enabled receiving device; and
determining if the second user responded.

19. The method for selectively transmitting alerts over a remote audio monitor system of claim 17 further comprising the step of:
determining the second user responded by receiving data from the second Bluetooth enabled receiving device.

20. The method for selectively transmitting alerts over a remote audio monitor system of claim 19 further comprising the steps of:
determining the second user has not responded to the alert one or more times;
determining if there is a third Bluetooth enabled receiving device;
determining the third Bluetooth enabled receiving device; and
transmitting the alert to a third user through the third Bluetooth enabled receiving device.

21. The method for selectively transmitting alerts over a remote audio monitor system of claim 14 or claim 20 further comprising the step of:
determining if a wait period is present, after an onset of a sound.

22. The method for selectively transmitting alerts over a remote audio monitor system of claim 21 further comprising the steps of:
timing a period of the sound; and
determining if the sound is still present after a specified period.

23. The method for selectively transmitting alerts over a remote audio monitor system of claim 22 further comprising the step of:
determining the sound was not present for the specified period.

24. The method for selectively transmitting alerts over a remote audio monitor system of claim 23 further comprising the step of:
determining the sound is present for the specified period of time; and
transmitting an alert to the first Bluetooth enabled device.

25. A remote monitor system comprising:
one or more pods, each of the one or more pods comprising a Bluetooth radio,
a Wi-Fi radio, or a Bluetooth radio and a Wi-Fi radio;
one or more remote monitors, each of the remote monitors comprising a Bluetooth radio or a Wi-Fi radio;
a first receiving device, wherein the first receiving device comprises a Bluetooth radio or a Wi-Fi radio;
a second receiving device, wherein the second receiving device comprises a Bluetooth radio or a Wi-Fi radio; and
non-transitory computer readable media, said computer readable media having computer executable instructions for performing a method comprising the steps of:
waiting to detect a sound or motion through a remote monitor;
detecting a sound or motion;
determining whether the first receiving device or the second receiving device should receive an alert, based on settings established through a user interface;
determining a device to receive the alert is a first receiving device,
based on settings established through the user interface;
transmitting an alert to the first receiving device;
determining a time;
selectively transmitting an alert to the first receiving device based on the time, in accordance with settings established through the user interface;
waiting for a response from a first user, through the first receiving device; and
determining if the first user responded;
wherein the following settings are controlled through the user interface:
times when alerts will be transmitted to a first Bluetooth enabled receiving device;
times when alerts will be transmitted to a second Bluetooth enabled receiving device;
addition of other Bluetooth enabled receiving devices;
removal of Bluetooth enabled receiving devices from the system;
time periods for which sound must be present before an alert will be sent; and
actions to be taken by the system if no response is received from the first user.

26. The remote monitor system of claim 25, wherein the computer executable instructions for performing the method further comprises the steps of comprising the step of:
determining the first user responded by receiving data from the first receiving device.

27. The remote monitor system of claim 25, wherein the computer executable instructions for performing the method further comprises the steps of comprising the steps of:
determining the first user has not responded; and
transmitting the alert to the first receiving device one or more times, a total number of one or more times determined by settings established on the system.

28. The remote monitor system of claim 27, wherein the computer executable instructions for performing the method further comprises the steps of comprising the steps of:
determining the first user has not responded to the alert one or more times;
determining if the second receiving device is presently on the system;
identifying the second receiving device; and transmitting the alert to a second user through the second receiving device.

29. The remote monitor system of claim 28, wherein the computer executable instructions for performing the method further comprises the steps of comprising the steps of:
waiting for a response from the second user, through the second receiving device; and
determining if the second user responded.

30. The remote monitor system of claim 28, wherein the computer executable instructions for performing the method further comprises the steps of comprising the step of:
determining the second user responded by receiving data from the second receiving device.

31. The remote monitor system of claim 30, wherein the computer executable instructions for performing the method further comprises the steps comprising the step of:
determining the second user has not responded to the alert one or more times;
determining if there is a third receiving device;
determining the third receiving device; and
transmitting the alert to a third user through the third receiving device.

32. The remote monitor of claim 25 or claim 31 further comprising:
one or more monitors that further comprise a video recorder.

33. The remote monitor system of claim 25 or claim 31, wherein the computer executable instructions for performing the method further comprises the steps of comprising the step of:
determining if a wait period is present, after an onset of a sound or a motion.

34. The remote monitor system of claim 32, wherein the computer executable instructions for performing the method further comprises the steps of comprising the steps of:
timing the period of the sound or the motion; and
determining if the sound or the motion is still present after a specified period.

35. The remote monitor system of claim 34, wherein the computer executable instructions for performing the method further comprises the steps of comprising the steps of:
determining the sound or the motion was not present for the specified period.

36. The remote monitor system of claim 33, wherein the computer executable instructions for performing the method further comprises the steps of comprising the steps of:
determining the sound or the motion is present for the specified period; and
transmitting an alert to the first receiving device.

37. The remote monitor system of claim 36 wherein at least one of the first receiving device or the second receiving device comprises a wearable device.

38. The remote monitor system of claim 25 or claim 31 wherein the at least one of the first receiving device or the second receiving device comprises a device capable of receiving and displaying video images.

39. The remote monitor system of claim 38 wherein data transmitted to at least one of the first receiving device or the second receiving device is transmitted through Wi-Fi signals.

40. The remote monitor system of claim 38 wherein data transmitted to the first receiving device and the second receiving device is transmitted through Wi-Fi signals.

* * * * *